March 19, 1935.  O. W. LOUDENSLAGER  1,994,722
RESILIENT DEVICE
Filed July 9, 1931
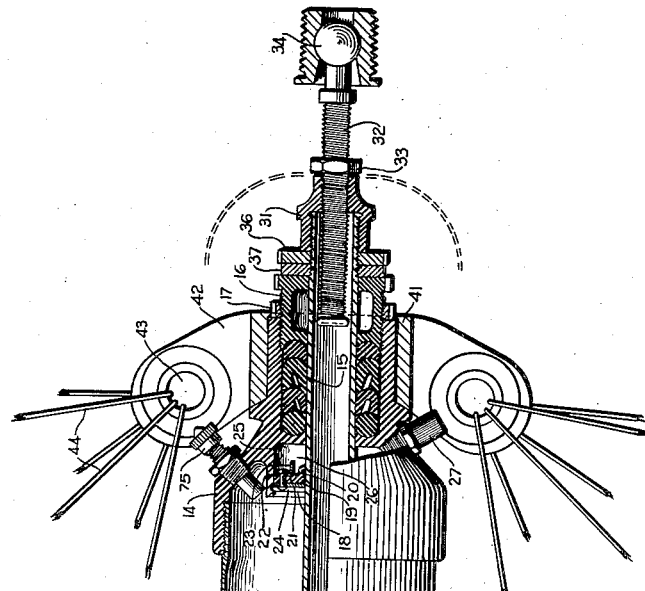
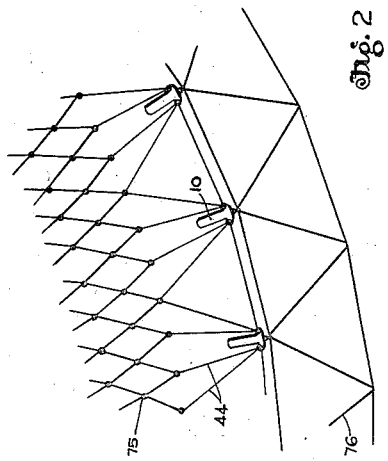
Inventor
OSCAR W LOUDENSLAGER
Attorney Patented Mar. 19, 1935

1,994,722

UNITED STATES PATENT OFFICE 1,994,722

RESILIENT DEVICE

Oscar W. Loudenslager, Akron, Ohio, assignor to Goodyear-Zeppelin Corporation, Akron, Ohio, a corporation of Delaware Application July 9, 1931, Serial No. 549,706

19 Claims. (Cl. 267—1)

This invention relates to shock absorbers or resilient connecting devices and more particularly to such devices employing fluid cushioning means.

One object of the invention is to provide an air cylinder including resilient device in which the resiliency of the device will be substantially constant over long periods of use without adjustment.

Another object of the invention is to provide a mechanically strong, cushioning device which is adjustable to any desired resiliency, but which will be sufficiently light in weight as to be particularly adaptable to use on aircraft.

Another object of the invention is to provide improved sealing means and a new combination of parts in a fluid cushioning device.

Another object of the invention resides in the provision of resilient connecting means which are particularly adapted to secure bulkheads in place in the main rings of a rigid airship.

For a better understanding of the invention, reference may now be had to the accompanying drawing, in which:

Fig. 1 is a longitudinal sectional view illustrating the device embodying the invention.

Fig. 2 is a fragmentary view of a bulkhead netting and main frame of a rigid airship illustrating the manner in which the resilient device connects the same together.

Referring to the drawing, a cylinder 10 slidably carries a piston 11 that is secured to a hollow piston rod 12 in any desired manner, such as by a plug 13 which is threaded to engage cooperating threaded portions on the piston and rod. The rod 12 extends through and is slidably journaled in a cylinder cap 14, which is secured to one end of the cylinder 10. The cap 14 is provided with suitable mechanical pressure gasket means for sealing against the rod 12, which includes packing 15 disposed in a channel in the cap 14. A gland nut 16, which surrounds the rod 12 and which is threaded in the end of the cap 14, serves to clamp the packing 15 tightly in place and against the rod 12. A lock nut 17 is provided on the gland nut 16 and engages the end of the cap 14 to hold the gland nut 16 locked in any desired position.

Other sealing means 18 are also provided between the cap 14 and piston rod 12, which sealing means are fluid actuated and which include a flexible member 19 of leather or rubber. The flexible member 19 is formed with an integral axially extending annular lip 20 and is adapted to be supported between metal washers 21 and 22. The washer 22 is provided with an axially extending annular flange 23 at its inner periphery which strengthens the washer but does not interfere with application of fluid pressure means to the lip 20 of the flexible member 19. The whole unit or sealing means 18 is positioned by a locking ring 24 in a chamber 25 formed in the inner end of the cap 14. The chamber 25 is filled with grease or other heavy lubricant 26, and to this end a pressure gun valve fitting 27 is provided on the cap 14, which opens to the chamber 25.

The rod 12 is provided with extensible means and for this purpose the outer end of the rod is provided with a cap 31, which is internally threaded and receives a threaded rod 32. The threaded rod 32 is locked in position by a lock nut 33 which engages with the cap 31. The rod 32 is adapted to be secured to one of the members to be connected together preferably through the agency of a ball and socket joint, which is indicated diagrammatically at 34. The cap 31 is locked on the end of the piston rod 12 by a nut 36, and leather or other cushioning means 37 is provided between the nut 36 and the gland nut 16.

Surrounding the cap 13 is a collar 41 which is provided with a number of radially extending lugs 42 formed with suitable eyelets 43. The collar 41 and thus the cylinder 10 can be secured by any suitable means such as wires 44, to the other of the members to be resiliently connected together.

The piston 11 is provided with mechanical pressure means for sealing against the cylinder 10, which means comprise a plurality of gaskets 51 which are received about the piston. The gaskets 51 are separated by metal rings 52 and the whole assembly is forced together and into sealing relation with the inner wall of the cylinder by a ring 53, which is threaded on the piston 11.

Additional fluid pressure means for sealing between the piston and the cylinder are provided, which are indicated generally by the numeral 54, and which include a collar 55 secured on the rod 12 adjacent the piston 11. The sealing means 54 are carried on the collar 55 and comprise a flexible member 56 of leather or rubber which is supported by metal washers 57 and 58. The flexible member 56 is formed with an integral annular lip 59 and the washer 58 is formed with an inwardly turned annular flange 60 around the outer edges so that fluid under pressure will be readily accessible to the lip 59. From the drawing, it will be observed that a chamber 61 is formed between the sealing means 54 and the piston. The chamber is filled with grease 62 or other lubricating means which is supplied thereto under pressure by way of a pressure gun fitting 63 connected with the chamber by passages 64, which fitting is carried in the plug 13 connecting the rod 12 and piston 11 together.

The ring 53 is provided with passages 65 which open to the chamber 61 so that the lubricant 62 will extend up into contacting relation with the end gasket 51 and will force it into engagement with the cylinder 10 by fluid as well as mechanical pressure.

In order to limit the movement of the piston 11 in the cylinder, suitable means are preferably provided which may comprise a sleeve 67 carried on the rod 12 which serves to position a flanged abutment 68 on the rod 12. In the movement of the rod 12 and piston 11 outwardly, the abutment 68 will engage with the inner end of the cap 14 to limit the travel of the rod 12 and piston 11 in the cylinder 10.

A ring cap 71, filled with absorbent waste 72, may be secured over the end of the cylinder 10 opposite of the cap 14 and will serve to absorb any leakage of oil or grease past the gasket means on the piston.

In order to provide any desired pressure within the cylinder 10, a valve 75 is secured in the cap 14, which valve is connected with the interior of the cylinder 10.

In the operation of the device the chambers 25 and 61 are initially filled with the lubricants 26 and 62 by way of the fittings 27 and 63. Sufficient lubricant is supplied so that considerable pressure is provided in the chambers which pressure serves to force the lips 20 and 59 of the flexible members 21 and 57 tightly into sealing engagement. Fluid, such as air, is now supplied to the interior of the cylinder 10 to establish any desired pressure so that the device will be given an initial resiliency.

The device is now ready to resiliently connect any desired members together, which members may, as shown in Fig. 2, comprise a wire bulkhead 75 and a main transverse frame 76 of a rigid airship. The rod 12 of the device will be connected to the frame 76 through the extensible threaded rod 32 and ball and socket joint 34 while the cylinder 10 will be connected to the bulkhead 75 through the agency of the wires 44 and collar 41.

The seal provided by the mechanical gasket means 14 and 51 can be adjusted by tightening the gland nut 16 and the ring 53 respectively. The pressures in the chambers 61 and 25 may be revived or increased as found necessary from time to time by applying a pressure gun to the fittings 27 and 63. This can be done while the resilient fastening device is in operation.

If it is desired to adjust the distance between the means fastened together by the resilient device, the lock nut 33 on the threaded rod 32 may be turned back and the rod 32 screwed in or out of the cap 31 the desired distance after which the nut 33 is run down against the cap 31 to lock the rod 32 in the adjusted position.

By making the collar 41 smaller than the overall diameter of the cap 14 and cylinder 10, any chance for the fastening means to fail completely mechanically is reduced inasmuch as the piston 11 will be too big to pass through the collar 41. In use the piston 11 and rod 12 can travel in the cylinder 10 only until the abutment 68 engages with the inside end of the cap 14. The distance the abutment 68 is from the piston 11 can be varied by changing the length of the cylinder 67. The leather washer 37 provides a cushion between the gland nut 16 and the nut 36 on the rod 12 so that the complete inward movement of the rod 12 into the cylinder 10 will be somewhat cushioned.

From the foregoing description, it will be seen that a resilient connecting device has been provided in which the resiliency can be initially adjusted over a wide range and which can be readily changed when desired. The device is strong and efficient in operation and yet is light in weight. Mechanical and fluid pressure means are provided between the piston and cylinder and between the rod and cylinder cap so that the initially applied pressure in the cylinder is retained substantially constant in use over long periods. The resilient fastening device provides adjustable means whereby the distance between the means to be fastened together can be varied, which feature allows it to be more readily secured to the means to be fastened together and which also gives a very desirable take-up between the means.

While the resilient fastening device is light in weight and is particularly adapted for use with aircraft, it will be apparent that it may be used in substantially any relation in which a resilient fastening member or shock absorber is required.

Although I have illustrated but the preferred form of the invention and have described that form in detail, it will be apparent to those skilled in the art that the invention is not so limited but that various modifications may be made therein without departing from the spirit of the invention or from the scope of the appended claims.

What I claim is:

1. A resilient connecting device including a cylinder having one closed end, a piston slidably carried in the cylinder, a rod secured to the piston and extending through the closed end of the cylinder, means for sealing between the rod and the end of the cylinder which include a gasket carried by the cylinder end, a gasket nut surrounding the rod and adapted to force the gasket into engagement with the rod, and an additional gasket carried by the cylinder end, the cylinder end having a chamber behind the last named gasket, lubricating means in the chamber, and means through which pressure can be applied to the chamber, means for sealing between the piston and the cylinder including a plurality of gaskets carried in a wide peripheral channel on the piston, a ring for holding the gaskets in position and for exerting pressure thereon, an additional gasket carried by the piston, said piston having a chamber behind the last named gasket in communication with certain of the first named gaskets on the piston, lubricating means in the chamber, and means whereby pressure can be applied to the lubricating means, and means whereby a fluid under pressure can be applied to the interior of the cylinder.

2. A resilient connecting device including a cylinder having one closed end, a piston slidably carried in the cylinder, a rod secured to the piston and extending through the closed end of the cylinder, gasket means for sealing between the rod and the end of the cylinder which include a gasket carried by the cylinder end, a gasket nut surrounding the rod and adapted to force the gasket into engagement with the rod, an additional gasket carried by the cylinder end, the cylinder end having a chamber behind the last named gasket, lubricating means in the chamber, and means whereby pressure can be applied to the chamber, gasket means for sealing between the piston and the cylinder and means whereby a fluid under pressure can be applied to the interior of the cylinder.

3. A resilient connecting device including a cylinder having one closed end, a piston slidably carried in the cylinder, a rod secured to the piston and extending through the closed end of the cylinder, means for sealing between the rod and the end of the cylinder, means for sealing between the piston and the cylinder including a plurality of gaskets sealed in a wide peripheral channel on the piston, a ring for holding the gaskets in position and for exerting pressure thereon, an additional gasket carried by the piston, said piston having a chamber behind the last named gasket in communication with certain of the first named gaskets also, lubricating means in the chamber, and means whereby pressure can be applied to the lubricating means, and means whereby a fluid under pressure can be applied to the interior of the cylinder.

4. A resilient device including a cylinder having one closed end, a piston slidably carried in the cylinder, a rod secured to the piston and extending through the closed end of the cylinder, means for sealing between the rod and the end of the cylinder which include a gasket carried by the cylinder end, a gasket nut surrounding the rod and adapted to force the gasket into engagement with the rod, and an additional gasket carried by the cylinder end, the cylinder end having a chamber behind the last named gasket, lubricating means in the chamber, and means whereby pressure can be applied to the chamber to force the last-named gasket into sealing relation with the rod.

5. A resilient device including a cylinder having one closed end, a piston slidably carried in the cylinder, a rod secured to the piston and extending through the closed end of the cylinder, means for sealing between the piston and the cylinder including a gasket carried in a peripheral channel on the piston, a ring for holding the gasket in the channel and for exerting mechanical sealing pressure thereon, an additional fluid operated gasket carried by the piston, said piston having a chamber behind the last named gasket in communication with the first named gasket, lubricating means in the chamber, and means whereby pressure can be applied to the lubricating means to force all of the gaskets into tighter sealing relation.

6. A resilient device comprising a cylinder having a closed end, a piston in the cylinder, a rod secured to the piston and extending through the end of the cylinder, gasket means sealing between the piston and cylinder, and gasket means sealing between the rod and the end of the cylinder, each of the gasket means including means sealing by lubricating fluid pressure, and means sealing by mechanical pressure, and means whereby fluid under pressure can be inserted in the cylinder to control the resiliency of the device.

7. A resilient fastening device comprising a cylinder, a piston in the cylinder, a rod secured to the piston and extending through the end of the cylinder, gasket means sealing between the piston and cylinder, and gasket means sealing between the rod and the end of the cylinder, each of the gasket means including means sealing by lubricating fluid pressure, and means sealing by mechanical pressure.

8. A resilient connecting device comprising a cylinder having a closed end, a piston in the cylinder, mechanical sealing means and fluid pressure sealing means between the piston and the cylinder, a hollow rod secured to the piston and extending through the end of the cylinder, mechanical sealing means and fluid pressure sealing means between the rod and the end of the cylinder, a collar on the cylinder adjacent the end thereof through which the rod extends, the collar being smaller than the cylinder, means on the collar by which the cylinder is secured to one of the members to be connected together, and means secured to and extending into the hollow rod an adjustable distance by which the rod is secured to the other of the members to be connected together.

9. A resilient connecting device comprising a cylinder having a closed end, a piston slidably carried in the cylinder, a rod connected to the piston and extending through the end of the cylinder, fluid pressure sealing means between the rod and the cylinder end, and between the piston and the cylinder, and valved conduit means connected with the fluid pressure sealing means, the conduit means being positioned so that fluid under pressure can be supplied thereto while the device is in operation.

10. A resilient connecting device comprising a cylinder having a closed end, a piston slidably carried in the cylinder, a rod connected to the piston and extending through the end of the cylinder, fluid pressure sealing means between the piston and the cylinder and valved conduit means connected with the fluid pressure sealing means, the conduit means being positioned so that fluid under pressure can be supplied thereto while the device is in operation.

11. In combination, a cylindrical member, a member slidably carried in the cylindrical member, sealing means carried by one of the members and engaging with the other member including a flexible disc having an annular, axially-extending, flange-lip in engagement with the member not carrying the sealing means, metal reinforcing discs secured to each side of the flexible disc, the disc on the lip side of the flexible disc being of smaller diameter than the flexible disc, the other disc being substantially the same diameter as the flange lip and serving to properly center the flange lip, the member carrying the sealing means being provided with a chamber opening on the lip side of the sealing means, and a lubricant under pressure in the chamber.

12. In an air spring, a pair of telescoping members, one of said members comprising an annular packing bearing against the adjacent wall of the other member, said first named member also having an annular recess filled with lubricant, the latter being exposed to contact with said wall, and means for replenishing said lubricant from the exterior of the device.

13. In an air spring, a pair of telescoping members closed at their ends to form a pressure chamber, means for sealing the sliding joints between said members, one of said means comprising an annular packing carried by one member and bearing against the adjacent wall of the other member, an annular chamber for grease also carried by said first named member, and grease in said chamber, the wall of said grease chamber adjacent said pressure chamber being adapted to transmit pressure to said grease chamber.

14. In an air spring, a pair of telescoping members closed at their ends to form a pressure chamber, means for sealing the sliding joints between said members, one of said means comprising an annular packing carried by one member and bearing against the adjacent wall of the other member, an annular chamber for grease also carried by said first named member, grease in said chamber, the wall of said grease chamber adjacent said pressure chamber being movable to a limited extent in response to variations in pressure between said two chambers, and a check valve through which grease under pressure may be admitted to said grease chamber from the exterior of the device.

15. In an air spring, two telescoping members, one of said members carrying a packing for the sliding joint between the members and carrying also a pocket of grease adjacent said packing, said grease contacting the telescoping surface of the other of said members, means for exerting pressure upon the grease in said pocket, and means accessible from the exterior of the device for injecting grease into said pocket against the action of said pressure exerting means.

16. In an air spring, a pair of telescoping members, one of said members comprising an annular packing bearing against the adjacent wall of the other member, said first named member also having an annular recess, and a check valve accessible from the exterior of the device adapted to admit lubricant under pressure to said recess, the lubricant in said recess being exposed to contact with said wall.

17. In an air spring, a pair of telescoping members closed at their ends to form a pressure chamber, means for sealing the sliding joints between said members, one of said means comprising an annular packing carried by one member and bearing against the adjacent wall of the other member, an annular chamber for grease also carried by said first named member, and grease in said chamber, the wall of said grease chamber adjacent said pressure chamber being movable to a limited extent in response to variations in pressure between said two chambers.

18. In a resilient tension device, a cylinder closed at one end and open at the other end, a piston, a piston rod therefor extending through an opening in said closed end, said piston having an annular recess, annular packing means within said recess, a grease pocket movable with said piston and open only toward the inner wall of the cylinder, and a grease connection in said piston accessible through the open end of said cylinder and communicating with said grease pocket.

19. In an air spring, two telescoping members, one of said members carrying a packing for the sliding joint between the members, and a pocket of grease carried by the same member, said grease contacting the telescoping surface of the other of said members, said first named member having an area exposed to the exterior of the device and having a grease passage therethrough communicating with said pocket and with said exposed area, and a grease gun connection at the outer end of said passage.

OSCAR W. LOUDENSLAGER.